April 13, 1937.　　　　W. T. HOBBIS　　　　2,077,349
CONTAINER PICK-UP TRUCK
Filed Jan. 22, 1936　　　　2 Sheets-Sheet 1
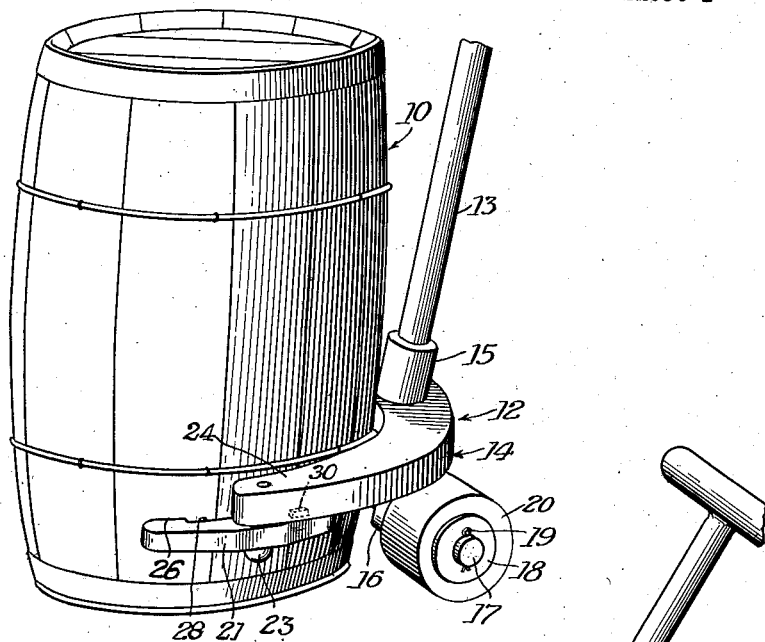
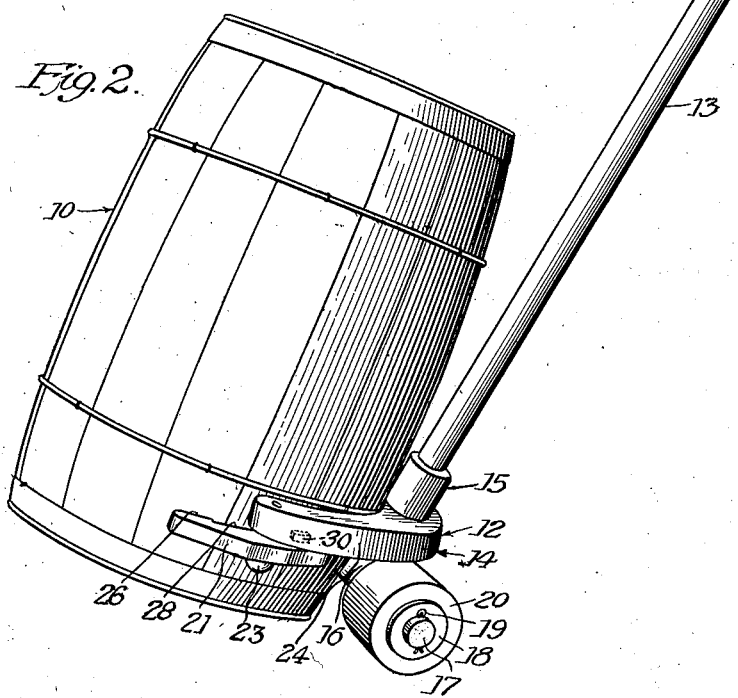
Witness:
Martin H. Olsen
Inventor:
William T. Hobbis
by Maxwell F. Cargill
Attorney.

April 13, 1937.  W. T. HOBBIS  2,077,349
CONTAINER PICK-UP TRUCK
Filed Jan. 22, 1936  2 Sheets-Sheet 2
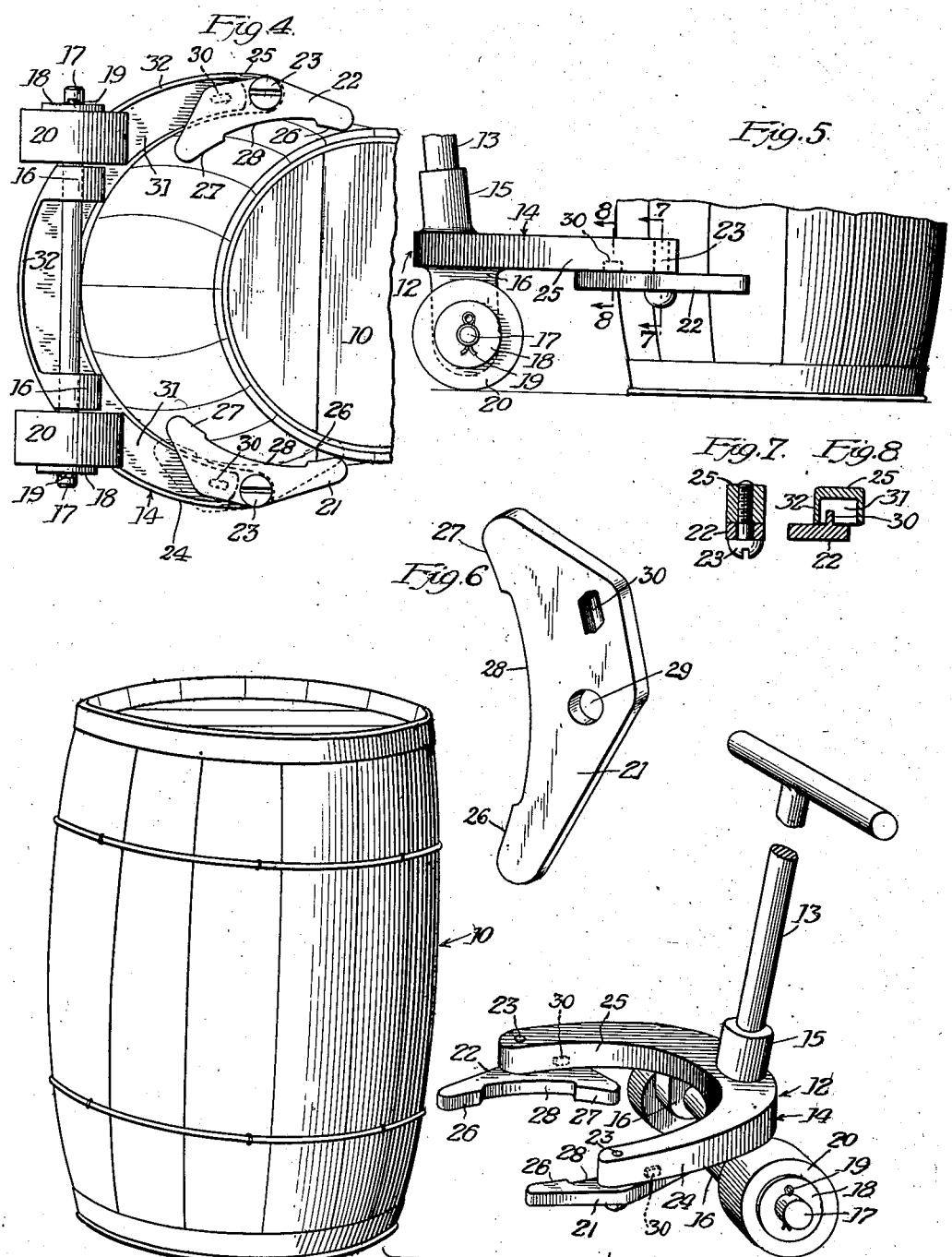
Witness:
Martin H. Olsen
Inventor:
William T. Hobbis
by Maxwell F. Cargill
Attorney.

Patented Apr. 13, 1937

2,077,349

UNITED STATES PATENT OFFICE 2,077,349

CONTAINER PICK-UP TRUCK

William T. Hobbis, Danville, Ill., assignor, by mesne assignments, to Wash Company, Chicago, Ill., a corporation of Illinois Application January 22, 1936, Serial No. 60,167

2 Claims. (Cl. 280—53)

This invention relates to improvements in container pick-up trucks.

One object of the invention is to provide a truck provided with means for engaging a container or article of appropriate shape such as a barrel, keg or like article for elevating the same and transporting and depositing it without manually handling the same. The invention is particularly of advantage in handling kegs, tubs, drums and barrels of heavy material, as nails, beer, starch, sugar or butter and the like.

Another object of the invention is to provide a truck having article engaging members which are self-adjusting into article engaging position and enable the truck to engage the article automatically when moved into position by the user.

Other objects of the invention relate to various features of construction and arrangement of parts which will be apparent from a consideration of the following specification and accompanying drawings, wherein:

Figure 1 is a perspective view of an embodiment of the improvements shown in engaging position with a container represented as a keg or barrel.

Figure 2 is a perspective view of the truck with the keg elevated to transporting position.

Figure 3 is a detached view in perspective of a keg and the truck showing the truck approaching engaging position or receding therefrom.

Figure 4 is a bottom plan view of the device and keg.

Figure 5 is a broken side elevation of the device in initial engaging position.

Figure 6 is an enlarged perspective of one of the two grip members with which the truck is provided.

Figure 7 is a sectional view taken on line 7—7 of Figure 5.

Figure 8 is a sectional view taken on line 8—8 of Figure 5.

In the drawings, 10 is a keg or barrel formed of staves but it will be understood that the truck may be used for engaging, elevating and transporting any type of container or other article of appropriate shape having a portion of major circumference and which is of a size coming within the working limits of the particular truck employed.

The truck is indicated generally by the numeral 12 and is provided with an upwardly extending handle 13 which is secured to an arcuate or semicircular frame member indicated generally by the numeral 14. In the drawings the rear of the frame is shown as provided with a boss 15 into which the handle projects and is secured.

The lower side of the frame 14 is provided with a pair of bearings 16 through which extends the axle 17. Collars 18, secured to the end of the axles by cotter pins 19, are provided for removably confining the wheels 20 on the axle. A pair of grab-members 21, 22 are pivotally secured by bolts or screws 23 to the lower surfaces of the respective arms 24 and 25 of the frame 14. The members 21 and 22 are provided with front and rear curved contact end portions 26 and 27 on the inner edges thereof, the curvature of which preferably corresponds to the curvature of the lower engageable portion of the keg, barrel or other downwardly converging or tapered object or container to be handled by the truck. The spacing of the portions 26 and 27 is effected by a relieved or cut away intermediate portion 28. Where the truck is to be employed in handling metal kegs or drums of relatively uniform surface formation, relieving the central portion of the grab members is not necessary but in handling stave kegs or barrels which frequently have irregular surfaces, it is desirable to shape the grab members as illustrated to enable the same to engage the container firmly adjacent the ends of the members to restrain tilting of the container with respect to the grab members after elevation thereof.

Figure 6 illustrates in perspective the grab member of arm 24 which is shown as provided with an opening 29 through which the bolt 23 passes and an upwardly projecting stop or lug 30 which extends into a channel or recess 31 on the lower surface of the arm. The recess may be formed by relieving the medial portion of the arms which results in the provision of depending strengthening marginal flanges 32 on the lower surface of the frame 14 as shown in Figure 4. The grab members 21 and 22 are similarly formed and it will be observed that the respective lugs 30 limit the extent of swinging movement of the grab members so as to retain them within operative position.

In the use of the truck the operator tilts the handle forwardly to move the frame 14 to substantially horizontal position, as shown in Figure 3, and moves it into engagement with the barrel, keg or like object to be transported as shown in Figure 1. The grab members 21 and 22, being curved or rounded suitably at the forward ends, move pivotally to adjust themselves to the contour of the object with the arcuate portions 26 and 27 in contact with the correspondingly curved surface of the container.

With the grab members in the position described it will be seen that rearward tilting of the handle 13 about the axle 17 to elevate the forward ends of the arms 24 and 25 will cause the grab members 21 and 22 to firmly adjust themselves to the contour of the container and due to the upwardly flaring shape of the engaged portion thereof, will cause the container to be elevated as illustrated in Figure 2. The user can then transport the object while held in the position shown in Figure 2 and upon depositing it the truck can be moved freely out of engagement. In Figures 3 and 4 it will be noted that the inner faces of the members 21 and 22 are disposed inwardly of the corresponding faces of the arms whereby the arcuate arms closely embrace the container when the grab members are in engagement therewith. This arrangement tends to restrain tilting or racking of the container with respect to the frame and grab members during elevation and transportation.

The present improvements facilitate the movement of kegs, barrels, tubs, drums or like suitably shaped container or objects in factories, stores, warehouses, creameries, breweries and other establishments where the products are relatively heavy since the device automatically grabs the object to elevate it to transportation position and automatically releases the container when it is deposited and the weight is removed from the grab members, all without turning the container over and disturbing or agitating the contents thereof.

For convenience the term container is used in a generic sense in the claims to include kegs, barrels, drums or like objects having major circumferences above the portion engaged by the truck.

While I have shown and described an embodiment of the improvements for the purpose of illustration, I do not wish to be restricted specifically thereto except as so limited by the appended claims.

I claim:

1. A truck for lifting and transporting containers comprising a pair of wheels, a pair of arms tiltably supported thereby and spaced apart for accommodating the lower portion of a container therebetween, a handle operatively secured to said arms for tilting the same and moving the truck, a pair of self-adjusting container engaging and supporting members pivotally secured intermediate the ends thereof in overlapping relation to the forward portions of corresponding surfaces of said arms and having arcuate container engaging faces and coacting means provided in the overlapping portions of said members and arms for limiting the pivotal movement of said members with respect to said arms.

2. A wheeled truck for elevating and transporting containers comprising a tiltable frame, a handle secured to said frame for tilting the same and moving the truck, a pair of generally horizontal arms carried by and extending forwardly from said frame and spaced apart to accommodate the lower end of a container therebetween, a pair of self-adjusting opposed grab members each pivotally secured to and projecting inwardly of one of said horizontal surfaces of said arms adjacent the forward end thereof for engaging the outer surface of a container below the portion of major circumference thereof upon the upward tilting of said arms with respect to a container disposed therebetween, and means comprising coacting studs and recesses provided in said members and arms for limiting the pivotal movement of said members beyond operative position.

WILLIAM T. HOBBIS.